United States Patent

Nicholl et al.

[11] Patent Number: 5,905,960
[45] Date of Patent: May 18, 1999

[54] METHOD OF HANDLING BUSY CALLS IN A MULTIPLE ZONE COMMUNICATION SYSTEM

[75] Inventors: Richard V. Nicholl, Chicago; Brian Poe, Schaumburg; Daniel J. McDonald, Cary, all of Ill.

[73] Assignee: Motorola, Inc., Schaumburg, Ill.

[21] Appl. No.: 08/829,629

[22] Filed: Mar. 31, 1997

[51] Int. Cl.$^6$ ............................... H04B 7/26; H04Q 7/02
[52] U.S. Cl. ..................... 455/450; 455/509; 455/520; 455/518
[58] Field of Search .................................... 455/450, 509, 455/510, 518, 519, 527, 528, 512, 520, 422

[56] References Cited

U.S. PATENT DOCUMENTS

| | | | |
|---|---|---|---|
| 3,898,390 | 8/1975 | Wells et al. | 455/434 |
| 5,054,109 | 10/1991 | Blackburn | 455/17 |
| 5,101,502 | 3/1992 | Felderman et al. | 455/520 |
| 5,287,552 | 2/1994 | Sasuta et al. | 455/518 |
| 5,313,652 | 5/1994 | Rozenstrauch et al. | 455/15 |
| 5,335,353 | 8/1994 | Cizek et al. | 455/17 |
| 5,457,735 | 10/1995 | Erickson | 455/509 |
| 5,551,062 | 8/1996 | Drozt et al. | 455/54.2 |
| 5,794,154 | 8/1998 | Bar-On et al. | 455/509 |

Primary Examiner—Reinhard J. Eisenzopf
Assistant Examiner—Duc Nguyen
Attorney, Agent, or Firm—Susan L. Lukasik

[57] ABSTRACT

A method of handling busy calls, performed by a controlling entity (ZC1) in a multiple-zone system, includes the steps of issuing (201) a request to participate in a call to one or more participating zones (101, 103, and 105) and concluding (203) that at least one zone of the participating zones (101, 103, and 105) is unable to grant the call, thereby resulting in a busy status for the call. The controlling entity (ZC1) informs the participating zones (101, 103 and 105) of the busy status. A resource available notification is received (209) from a first zone, and the controlling entity (ZC1) determines (211) if a predetermined number of the participating zones (101, 103, and 105) have indicated ability to grant the call. When at least one zone of the one or more participating zones has not indicated ability to grant the call, the controlling entity (ZC1) issues (213) a still busy notification to the first zone, which still busy notification indicates that the call still has a busy status.

20 Claims, 4 Drawing Sheets

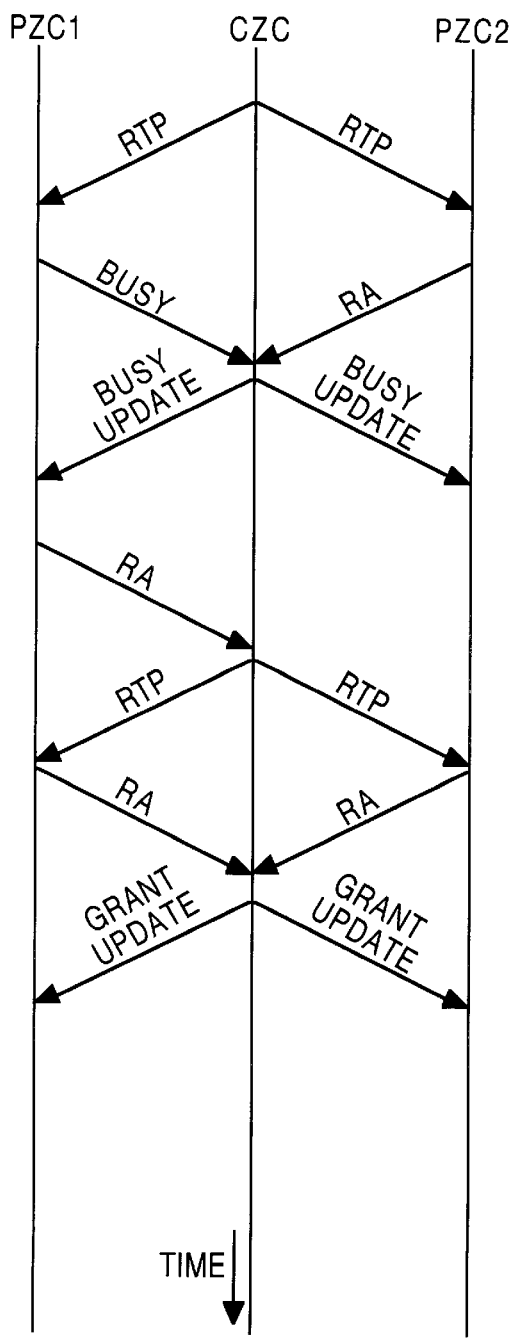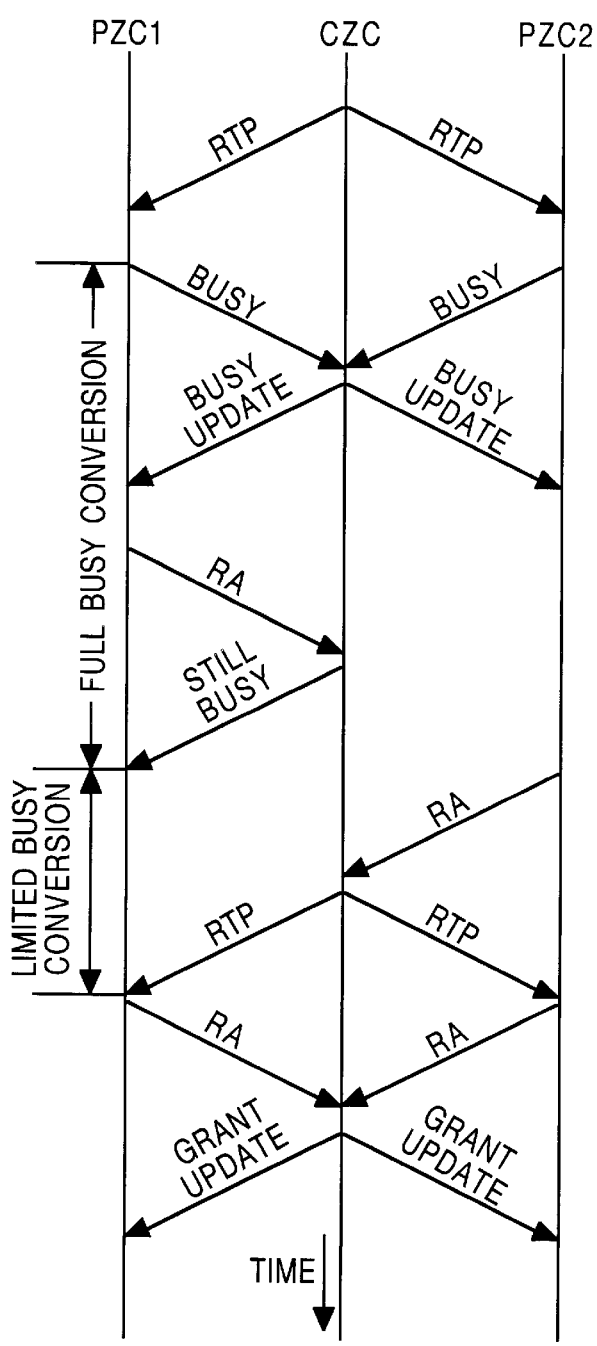

METHOD OF HANDLING BUSY CALLS IN A MULTIPLE ZONE COMMUNICATION SYSTEM

FIELD OF THE INVENTION

This invention relates to radio frequency (RF) communication systems, including but not limited to multiple-site trunked RF communication systems.

BACKGROUND OF THE INVENTION

The basic operation and structure of a land mobile radio system is well known. Land mobile radio systems typically comprise one or more radio communication units (e.g., vehicle-mounted or portable radios in a land mobile system and radio/telephones in a cellular system) and one or more repeaters that transceive information via the RF communication resources. These communication resources may be narrow band frequency modulated channels, time division multiplex slots, frequency pairs, and so forth. Land mobile radio systems may be organized as trunked communication systems, where a plurality of communication resources is allocated amongst a group of users by assigning the repeaters on a communication-by-communication basis with an RF coverage area.

Currently, there is a desire to have larger communication systems that cover much larger geographic areas. Today, communication systems are known to be organized into a plurality of communication sites, with a zone or network controller (ZC) attached to a bank of repeaters at each of the plurality of sites so that communication requests from a communication unit within a coverage area may be handled and organized amongst all of the sites that are connected to that zone controller. These repeaters may be intelligent repeaters, such as an IntelliRepeater™ available from Motorola, Inc., and the zone controller communicates with the intelligent repeater that is currently in control of the site. Alternatively, the repeaters may be standard repeaters with a site controller attached to the each of the repeaters at the site, and the site controller coordinates resources for the site.

There is, however, a limit to the number of sites that can be serviced by one zone controller. Consequently, a need exists for a way to provide communications over larger areas of land, particularly for a single call over larger areas of land than can be accommodated by today's multiple site systems.

BRIEF DESCRIPTION OF THE DRAWINGS

FIG. 4 is a timing diagram showing control traffic for busy conversion when a single participating zone is busy in accordance with the invention.

FIG. 5 is a timing diagram showing control traffic for busy conversion when multiple participating zones are busy in accordance with the invention.

DESCRIPTION OF A PREFERRED EMBODIMENT

Figure 1A:
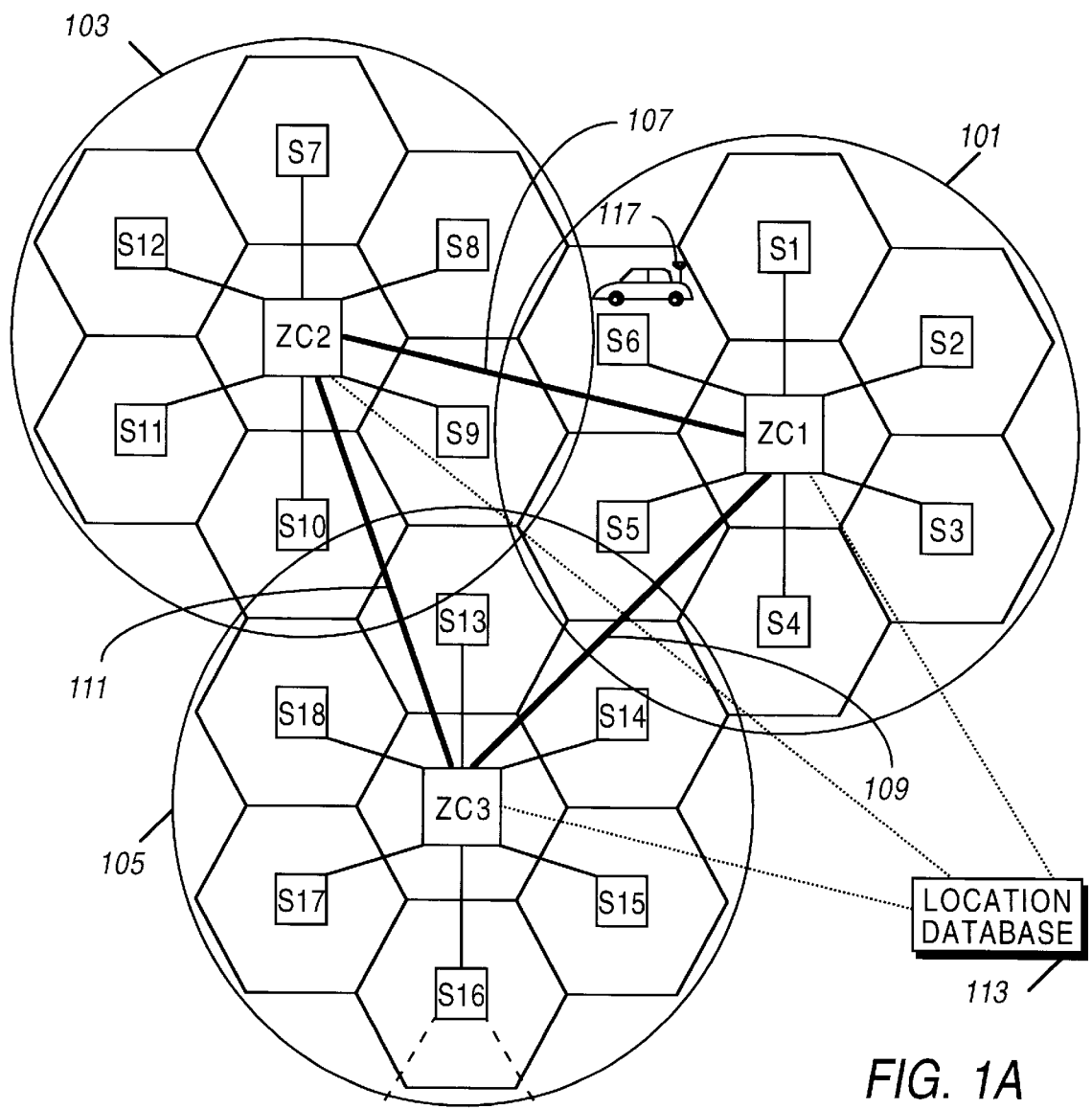
FIG. 1 is a block diagram of a communication system comprising multiple zones in accordance with the invention.

The following describes an apparatus for and method of converting busy calls into active calls in a multiple-zone communication system. In accord with the present invention, activity in the busy conversion process by and between the zone controllers in a multiple-zone communication system is limited so as to facilitate more efficient busy conversion processing of multiple-zone calls.

The method comprises the steps of issuing a request to participate in a call to one or more participating zones of a plurality of zones in a communication system and concluding that at least one zone of the one or more participating zones is unable to grant the call, thereby resulting in a busy status for the call. The one or more participating zones are informed of the busy status. At least one communication resource necessary to grant the call is obtained by a first zone of the one or more participating zones, and the first zone issues a resource available notification. The resource available notification is received from the first zone, and it is determined if a first predetermined number, which may be all, of the one or more participating zones have indicated ability to grant the call. When a second predetermined number, which may be one or more, of the one or more participating zones has not indicated ability to grant the call, a still busy notification is issued to the first zone, which still busy notification indicates that the call still has a busy status. Upon receiving the still busy notification, the first zone returns the at least one communication resource for possible allocation to another call.

The method may also comprise the step of, upon receipt of the still busy notification, inhibiting, by the first zone, performing the steps of obtaining any further communication resources necessary to grant the call and issuing any further resource available notifications. In addition, when a third predetermined number, which may be all, of the one or more participating zones have indicated ability to grant the call, another request to participate in the call may be issued to the one or more participating zones. The concluding, informing, obtaining, issuing a resource available notification, receiving, determining, and issuing another request to participate steps may be repeated until the first predetermined number, which may be all, of the one or more participating zones is able to grant the call. The step of concluding may comprise the step of receiving an indication from at least one of the one or more participating zones, which indication indicates whether or not the zone is able to allocate at least one communication resource necessary to grant the call; the step of determining if a controlling zone is able to allocate at least one communication resource necessary to grant the call; or the step of receiving an indication from at least one of the one or more participating zones, which indication indicates whether or not the call should proceed. The steps of issuing a request to participate, concluding, informing, receiving, determining, and issuing a still busy notification may be performed by a controlling zone controller.

A method, performed by a controlling entity, such as a controlling zone controller, in a system comprising a plurality of zones, comprises the steps of issuing a request to participate in a call to one or more participating zones of the plurality of zones and concluding that at least one zone of the one or more participating zones is unable to grant the call, thereby resulting in a busy status for the call. The controlling entity informs the one or more participating zones of the busy status. A resource available notification is received from a first zone, and the controlling entity determines if a predetermined number, which may be all, of the one or more participating zones have indicated ability to grant the call. When at least one zone of the one or more participating zones has not indicated ability to grant the call, the controlling entity issues a still busy notification to the first zone, which still busy notification indicates that the call still has a busy status.

In addition, when a predetermined number, which may be all, of the one or more participating zones have indicated ability to grant the call, another request to participate in a call may be issued to one or more participating zones of the plurality of zones. The concluding, informing, receiving, determining, and issuing another request to participate steps may be repeated until a predetermined number, which may be all, of the one or more participating zones is able to grant the call. The step of concluding may comprise the step of receiving an indication from at least one of the one or more participating zones, which indication indicates whether or not the zone is able to allocate at least one communication resource necessary to grant the call or may comprise the step of determining if the controlling zone is able to allocate at least one communication resource necessary to grant the call.

A method, performed by a participating zone controller in a multiple-zone system, comprises the steps of receiving a request to participate in a call and entering the call in a busy queue when the participating zone controller is unable to grant at least one communication resource necessary to grant the call. The participating zone controller subsequently obtains at least one communication resource necessary to grant the call and issues a resource available notification. When a still busy notification is received, the at least one communication resource is returned for possible allocation to another call. In addition, upon receipt of the still busy notification, the participating zone controller inhibits performing the steps of obtaining any further communication resources necessary to grant the call and issuing any further resource available notifications. The participating zone controller may also receive, from a controlling zone controller, a busy status notification indicating that the call is busy in one or more participating zones of the plurality of zones.

Figure 1B:
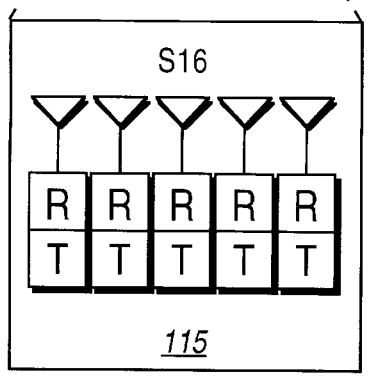

A block diagram of a communication system comprising a plurality of communication zones is shown in FIG. 1. A first zone 101 comprises a first zone controller ZC1 and a first plurality of communication sites S1, S2, S3, S4, S5, and S6. A second zone 103 comprises a second zone controller ZC2 and a second plurality of communication sites S7, S8, S9, S10, S11 and S12. A third zone 105 comprises a third zone controller ZC3 and a third plurality of communication sites S13, S14, S15, S16, S17, and S18. Each site is comprised of a plurality of repeaters 115, as is known in the art. Only three zones are shown for the simplicity of the drawings and specification, although the application would be successfully practiced in communication systems containing more or less than three zones. These zones are also referred to as systems, and calls covering multiple zones are also referred to as multiple-system calls. The zone controllers may be a SmartZone® Zone Controller Model available from Motorola, Inc.

Communication links 107, 109, and 111 provide a medium by which the zone controllers exchange information and signals, such that a single call may be supported across two or more zones 101, 103, and 105. These communication links 107, 109, and 111 may be wireline links, RF communication channels, microwave point-to-point communication links, and so forth. A communication unit 117 is shown in the first zone 101 and is moving toward the second zone 103. Each zone controller ZC1, ZC2, and ZC3 is connected to a location database 113. This location database, also referred to as a home location register (HLR), may be a single database to which each of the zone controllers is connected, or may be a distributed database connected to or residing at each of the zone controller locations. Each zone controller may contain and is responsible for a portion of the location database. The location database contains zone location information for individuals and talkgroups.

Figure 2:
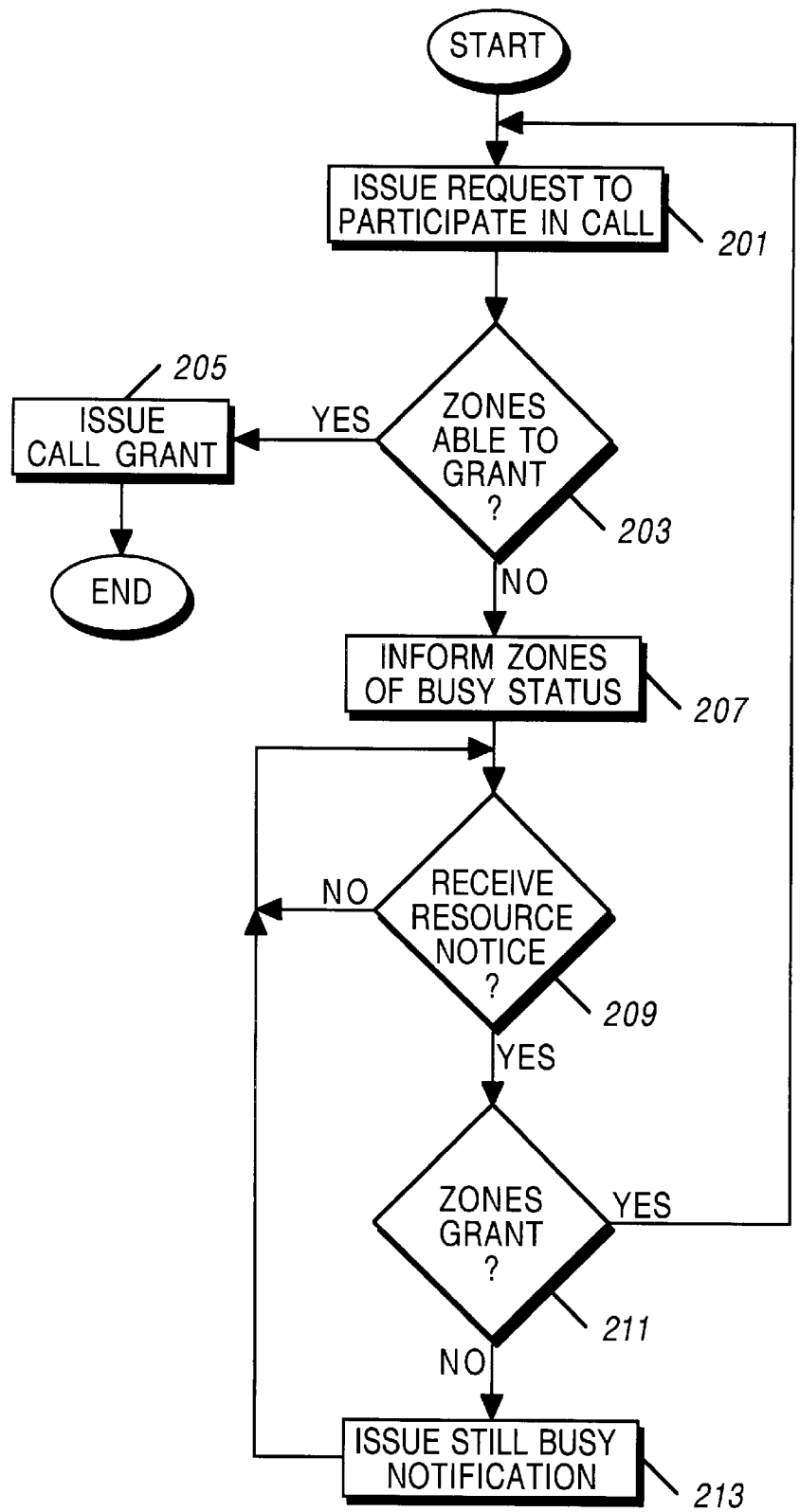
FIG. 2 is a flowchart showing a method of handling busy calls by a controlling entity in accordance with the invention.

A flowchart showing a method of handling busy calls by a controlling entity is shown in the flowchart of FIG. 2. In the preferred embodiment, the flowchart of FIG. 2 is performed by a microprocessor. The controlling entity is a part of a zone controller that functions as a controlling zone controller in the preferred embodiment. A zone controller may be designated as a controlling zone controller based, for example, on a particular call, individual identification, talkgroup, or geographic origination of the call, and may be statically or dynamically selected. The zone in which the controlling zone controller resides is referred to as the controlling zone. The flowchart of FIG. 2 will be described with respect to the example system shown in FIG. 1, where ZC1 provides the functionality of the controlling entity for the call in the example and is known as a controlling zone controller in the preferred embodiment. The controlling entity generally performs the function of coordinating resource availability with respect to multiple-zone calls. ZC2 and ZC3 are zone controllers for zones 103 and 105, respectively, that are participating in the call, and these zone controllers are thus referred to as participating zone controllers and the zones 103 and 105 are referred to as participating zones for the purpose of the call. The first zone 101 may also participate in the call, in which case ZC1 also performs the function of a participating zone controller. The controlling entity may be a separate entity in a communication system or may be integrated into an element of the system, as is the case for the preferred embodiment. Distribution of the controlling entity function is not critical to successful practice of the present invention.

At step 201, the controlling entity ZC1 issues a request to participate in the call to one or more participating zones 101, 103, and 105 of the plurality of zones in the communication system. At step 203, the controlling entity ZC1 determines if a predetermined number of the zones that are to be participating zones 101, 103, and 105 in the call are able to grant the call. In the preferred embodiment, the predetermined number is the total number of participating zones in the call. A zone is able to grant a call, when, for example, some or all communication resources necessary to participate in the call are available for assignment within a particular zone or when the zone indicates that the call can proceed, for example, because the zone need not assign resources or will not be able to allocate one or more resources within a reasonable time, e.g., due to a hardware failure. Thus, inability to grant a call may be temporary or permanent. In the preferred embodiment, temporary inability, rather than permanent inability as with a hardware failure, to allocate resources is considered with respect to a zone being able to grant a call. In the preferred embodiment, the communications resources include repeaters and/or their associated radio frequency communication resources (talkaround channels, time division multiplexed time slots, frequency pairs and so forth) and interzone audio paths, as may be provided by an AEB (Ambassador Electronics Bank). The determination of step 203 may be made by the controlling entity ZC1 receiving an indication from at least one or more of the participating zones, which indication indicates whether or not the zone is able to grant the call in that zone. Alternatively, when, the controlling zone for the particular call is also a participating zone, the controlling zone determines if it is able allocate one or more communication resources necessary to grant the call in the controlling zone. Further, rather than requiring all zones to have indicated ability at step 203, alternatively a significant portion of the participating zones or a particular subset of the participating zones (e.g., all high priority zones, only the controlling zone, or all zones except zones with hardware failure) may be acceptable for the process to continue with step 205.

If at step 203 all participating zones 101, 103, and 105 are able to grant the call, the process continues with step 205, where the controlling entity ZC1 issues a call grant such that the call can take place, and the process ends. If at step 203, all participating zones 101, 103, and 105 are not able to grant the call, the process continues with step 207, where the controlling entity ZC1 informs the participating zones of the busy status for the call. At step 209, the controlling entity ZC1 determines if it has received a resource available notification from any of the participating zones that had previously sent a busy indication to the controlling entity ZC1. If such a notice was received at step 209, the process continues with step 211, where the controlling entity ZC1 determines if all of the participating zone 101, 103, and 105 have indicated ability to grant the call. See the description for step 203 regarding when a zone is considered to have indicated ability to grant the call. Alternatively, rather than requiring all zones to have indicated ability at step 211, a significant portion of the participating zones or a particular subset of the participating zones (e.g., all high priority zones or the controlling zone) may be acceptable for the process to continue with step 201. If at this time all zones have not so indicated, the process continues with step 213, where the controlling entity ZC1 issues a still busy notification to one or more of the participating zones, so that the zones can at their discretion reassign any communication resources to any other call, and the process continues with step 209. In the preferred embodiment, the still busy notification is issued only to the participating zone(s) that sent the resource available notification at step 209.

If at step 211, all participating zones have indicated ability to grant the call, the process continues with step 201, where the controlling entity ZC1 issues another request to participate in the call. After the first time the controlling entity ZC1 issues a request to participate in the call at step 201, the controlling entity ZC1 may optionally avoid sending the request to participate at step 201 to the participating zone(s) that sent the resource available notification at step 209. The controlling entity ZC1 then continues through the steps of the flowchart until all zones have indicated present ability to grant the call. For example, such a determination would take place when after sending a request to participate, all zones reply with a resources available notification within a predetermined time period.

Figure 3:
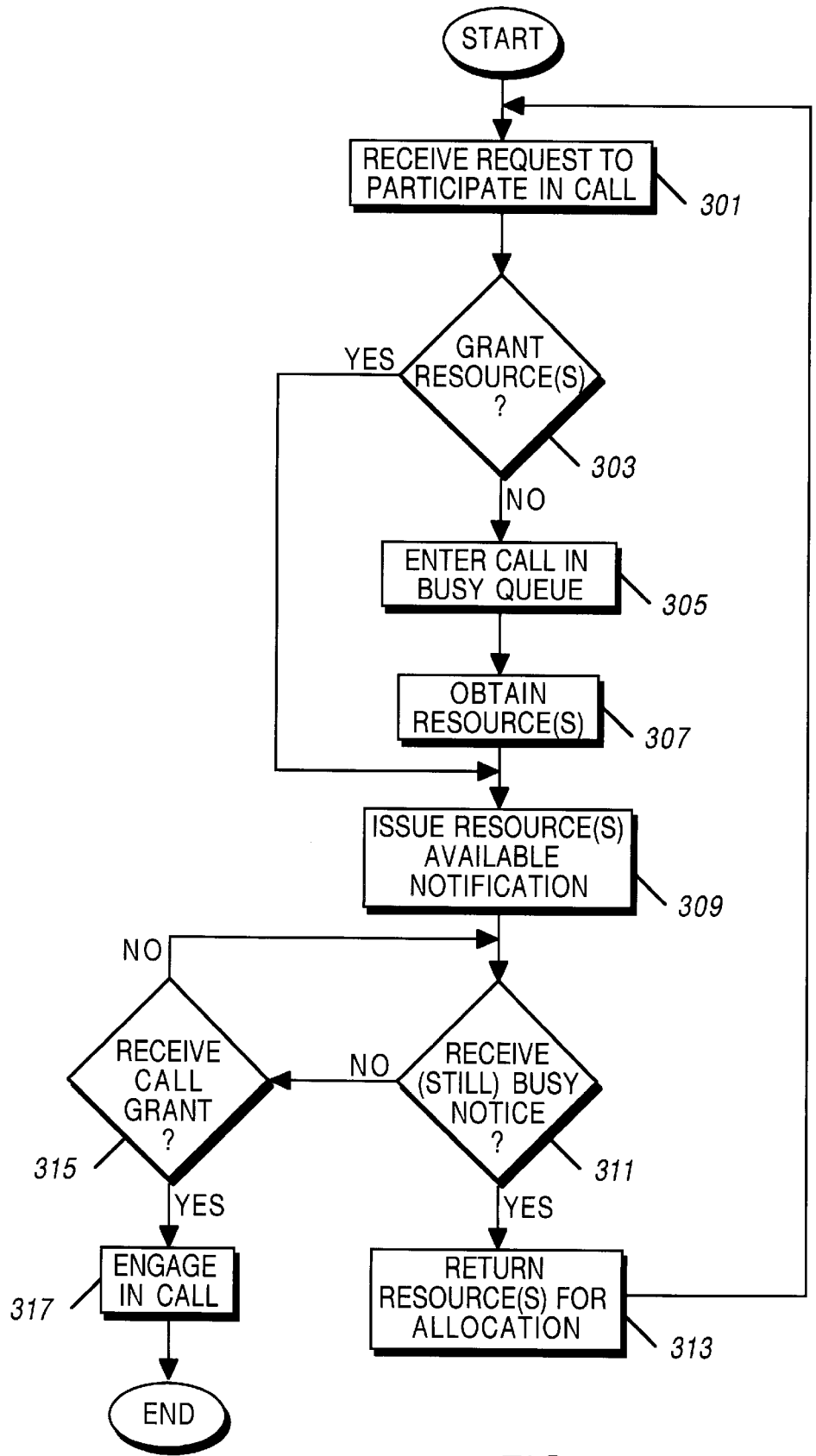
FIG. 3 is a flowchart showing a method of handling busy calls in a participating zone in accordance with the invention.

A flowchart showing a method of handling busy calls in a participating zone is shown in the flowchart of FIG. 3. A participating zone is defined as a zone that is targeted to participate in a call because members with which communication is desired are registered or otherwise located in the zone. In the preferred embodiment, a participating zone controller ZC2 from a participating zone 103 performs the steps of the flowchart of FIG. 3. Alternatively, another entity within the participating zone may perform the steps of the flowchart of FIG. 3, such as a site controller or intelligent repeater. The language herein refers to a participating zone performing various functions or receiving various signals, which language actually refers to an entity within the participating zone performing the functions/signals attributed to the zone.

At step 301, the participating zone 103 receives a request to participate in the call. At step 303, the participating zone 103 determines if it is capable of granting one or more resources necessary to complete the call. If resources are available at step 303, the process continues with step 309. If resources are not available at step 303, the process continues with step 305, where the call is entered in a busy queue. In the preferred embodiment, all resources necessary to complete the call must be available for the zone to be able to grant resources at step 303. Alternatively, fewer than all resources may be acceptable for the zone to be able to grant resources at step 303. In addition, step 303 may simply be interpreted as being able to grant any resource at step 303 results in the process continuing with step 309, and being able to grant no resource at step 303 results in the process continuing with step 305.

At step 307, the participating zone 103 attempts to obtain resource(s) to convert the call from busy status. When those resource(s) are obtained at step 307, the process continues with step 309, where the participating zone 103 issues a resource available notification. In the preferred embodiment, the resource available notification is issued to the controlling entity ZC1 of FIG. 2. After step 309, the process continues with step 311, where the participating zone 103 waits to receive a busy notification or a still busy notification, typically from a controlling entity. If such a notification is received at step 311, the process continues with step 313, where one or more resources are returned for possible allocation to another call, and the process continues with step 301. A resource is returned by making it available or releasing it such that the resource may be reallocated or reassigned to a different call. If no busy notification is received at step 311, the process continues with step 315. If at step 315 a call grant is received, the participating zone 103 issues the necessary control information to its appropriate sites (e.g., the sites the participating zone identified to participate in the call) and engages in the call at step 317, and the process ends. If at step 315, call grant is not received, the process continues with step 311.

As can be seen from the flowchart of FIG. 3, upon receipt of a still busy or busy notification, the participating zone controller inhibits its busy conversion process, in other words the participating zone does not attempt to obtain any further communication resources necessary to grant the call and also refrains from issuing any further resource available notifications.

Control traffic for a busy conversion when a single participating zone 103 is busy is shown in the timing diagram of FIG. 4. A controlling entity, referred to as a controlling zone controller (CZC) ZC1 with respect to FIG. 4, issues a request to participate (RTP) to each participating zone 103 and 105 for a particular call. The controlling zone controller then receives a busy indication from one participating zone controller (PZC1) 103 and a resource available (RA) notification from a second participating zone controller (PZC2) 105. Because of the busy indication received from PZC1, the controlling zone controller issues a busy update notification to each of the participating zones 103 and 105 and waits for a resource available notification from PZC1. Upon receipt of the RA notification from PZC1, the controlling zone controller ZC1 issues another request to participate to each of the participating zones to be sure that all zones required to participate are still able to allocate resources for the call. Optionally, the controlling zone controller ZC1 may avoid sending the RTP to PZC1 because PZC1 had immediately prior indicated availability, and will also assume an RA from PZC1 in this situation. In this example, all participating zones 103 and 105 are able to allocate resources for the call, hence both PZC1 and PZC2 return RA notifications to the controlling zone controller ZC1, which then issues a grant update to each of the participating zones so that the call may take place.

Control traffic for busy conversion when multiple participating zones are busy is shown in the timing diagram of FIG. 5. In the example shown, controlling entity, referred to as a controlling zone controller (CZC) ZC1 with respect to FIG. 5, sends a request to participate to the participating zones 101, 103, and 105. Zone controllers PZC1 and PZC2 return indications of busy to the controlling zone controller ZC1. The controlling zone controller ZC1 then issues a busy update to each of the participating zones 101 (not shown), 103, and 105. PZC1 then issues a resource available notification to the controlling zone controller ZC1, which indicates back to PZC1 that the call is still busy because the controlling zone controller ZC1 has not yet received an RA notification from PZC2. From the time PZC1 indicates a busy condition for the call, and until a still busy notification or another request to participate is received by PZC1, the participating zone controller is in full busy conversion mode. In the preferred embodiment, a PZC in full busy conversion continually evaluates resource availability and determines if resources necessary to grant the call have become available. During this mode, the participating zone is permitted to issue resource available notifications to the controlling zone when resources are obtained. At the time the still busy notification is received by PZC1, PZC1 enters limited busy conversion mode, wherein resources are returned for possible allocation to other calls, this call is maintained in the zone's busy queue, but no further attempt is made to obtain resources to grant the call, and consequently resource available notifications are not sent to the controlling zone controller during mode. Limited busy conversion mode ends in the preferred embodiment when a request to participate is received from the controlling zone controller ZC1. In this example, a resource available notification is issued from PZC2 to the controlling zone controller ZC1, upon which receipt the controlling zone controller ZC1 has received indications from all participating zones that resources were available at least in some point and time, and the controlling zone controller then issues another request to participate in the call. In this example, all participating zones 101, 103, and 105 return RA notifications, and the controlling zone controller ZC1 issues a grant update to all participating zones 101, 103, and 105, which take appropriate steps to grant the call in the appropriate sites within the participating zones.

The present invention provides for an efficient method for handling resource allocation in a multiple-zone controller-based communication system in which resources necessary to grant the call are temporarily unavailable. The present invention is an improvement over existing single zone controller based systems because existing systems do not have the capability to coordinate resource allocation across multiple zone controllers. Single zone systems coordinate resource allocation within a single zone controller and do not extend this coordination to other zone controllers. The present invention provides an efficient method for coordinating the busy conversion process because the method required communication with other zone controllers when there is a potential for the call to be converted from a busy to a granted call, thereby preventing unnecessary communication between the zone controllers participating in the call.

What is claimed is:

1. A method comprising the steps of:
issuing a request to participate in a call to one or more participating zones of a plurality of zones in a communication system, wherein each of the plurality of zones is comprised of a plurality of communication sites;
concluding that at least one zone of the one or more participating zones is unable to grant the call, thereby resulting in a busy status for the call;
informing the one or more participating zones of the busy status;
obtaining, by a first zone of the one or more participating zones, at least one communication resource necessary to grant the call;
issuing, by the first zone, a resource available notification;
receiving the resource available notification from the first zone;
determining if a first predetermined number of the one or more participating zones have indicated ability to grant the call;
when a second predetermined number of the one or more participating zones has not indicated ability to grant the call, issuing a still busy notification to the first zone, which still busy notification indicates that the call still has a busy status;
upon receiving the still busy notification, returning, by the first zone, the at least one communication resource for possible allocation to another call.

2. The method of claim 1, further comprising the step of, upon receipt of the still busy notification, inhibiting, by the first zone, performing the steps of:
obtaining any further communication resources necessary to grant the call; and
issuing any further resource available notifications.

3. The method of claim 1, further comprising the step of, when a third predetermined number of the one or more participating zones have indicated ability to grant the call, issuing another request to participate in the call to the one or more participating zones, wherein the third predetermined number is within three of the first predetermined number.

4. The method of claim 3, further comprising the step of repeating the concluding, informing, obtaining, issuing a resource available notification, receiving, determining, and issuing another request to participate steps until the first predetermined number of the one or more participating zones is able to grant the call.

5. The method of claim 1, wherein the step of concluding comprises the step of receiving an indication from at least one of the one or more participating zones, which indication indicates whether or not the zone is able to allocate at least one communication resource necessary to grant the call.

6. The method of claim 1, wherein the step of concluding comprises the step of determining if a controlling zone is able to allocate at least one communication resource necessary to grant the call.

7. The method of claim 1, wherein the step of concluding comprises the step of receiving an indication from at least one of the one or more participating zones, which indication indicates whether or not the call should proceed.

8. The method of claim 1, wherein the steps of issuing a request to participate, concluding, informing, receiving, determining, and issuing a still busy notification are performed by a controlling zone controller.

9. The method of claim 1, wherein the first predetermined number is all of the one or more participating zones and the second predetermined number is one of the one or more participating zones.

10. A method performed by a controlling entity in a system comprising a plurality of zones, the method comprising the steps of:

issuing a request to participate in a call to one or more participating zones of the plurality of zones, wherein each of the plurality of zones is comprised of a plurality of communication sites;

concluding that at least one zone of the one or more participating zones is unable to grant the call, thereby resulting in a busy status for the call;

informing the one or more participating zones of the busy status;

receiving a resource available notification from a first zone;

determining if a first predetermined number of the one or more participating zones have indicated ability to grant the call;

when a second predetermined number of the one or more participating zones has not indicated ability to grant the call, issuing a still busy notification to the first zone, which still busy notification indicates that the call still has a busy status.

11. The method of claim 10, further comprising the step of when a third predetermined number of the one or more participating zones have indicated ability to grant the call, issuing another request to participate in a call to one or more participating zones of the plurality of zones, wherein the third predetermined number is within three of the first predetermined number.

12. The method of claim 11, further comprising the step of repeating the concluding, informing, receiving, determining, and issuing another request to participate steps until the first predetermined number of the one or more participating zones is able to grant the call.

13. The method of claim 10, wherein the step of concluding comprises the step of receiving an indication from at least one of the one or more participating zones, which indication indicates whether or not the zone is able to allocate at least one communication resource necessary to grant the call.

14. The method of claim 10, wherein the step of concluding comprises the step of determining if a controlling zone is able to allocate at least one communication resource necessary to grant the call.

15. The method of claim 10, wherein the step of concluding comprises the step of receiving an indication from at least one of the one or more participating zones, which indication indicates whether or not the call should proceed.

16. The method of claim 10, wherein the controlling entity is a controlling zone controller.

17. The method of claim 10, wherein the first predetermined number is all of the one or more participating zones and the second predetermined number is one of the one or more participating zones.

18. A method performed by a participating zone controller in a system comprising a plurality of zones, wherein each of the plurality of zones is comprised of a plurality of communication sites the method comprising the steps of:

receiving a request to participate in a call;

entering the call in a busy queue when the participating zone controller is unable to grant at least one communication resource necessary to grant the call;

subsequently obtaining at least one communication resource necessary to grant the call;

issuing a resource available notification;

when a still busy notification is received, returning the at least one communication resource for possible allocation to another call.

19. The method of claim 18, further comprising the step of, upon receipt of the still busy notification, inhibiting, by the participating zone controller, performing the steps of:

obtaining any further communication resources necessary to grant the call; and issuing any further resource available notifications.

20. The method of claim 18, further comprising the step of receiving, from a controlling zone controller, a busy status notification indicating that the call is busy in one or more participating zones of the plurality of zones.

* * * * *